United States Patent
Ko et al.

(10) Patent No.: US 9,681,458 B2
(45) Date of Patent: Jun. 13, 2017

(54) METHODS FOR PACKET TRANSMISSION PROTECTION AND COMMUNICATIONS APPARATUS UTILIZING THE SAME

(71) Applicant: MediaTek Inc., Hsin-Chu (TW)

(72) Inventors: Li-Chun Ko, Taipei (TW); Yih-Shen Chen, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 23 days.

(21) Appl. No.: 14/536,839

(22) Filed: Nov. 10, 2014

(65) Prior Publication Data

US 2015/0131638 A1 May 14, 2015

Related U.S. Application Data

(60) Provisional application No. 61/902,425, filed on Nov. 11, 2013.

(51) Int. Cl.
| | |
|---|---|
| *H04J 3/00* | (2006.01) |
| *H04W 72/08* | (2009.01) |
| *H04B 7/26* | (2006.01) |
| *H04J 3/16* | (2006.01) |
| *H04L 29/08* | (2006.01) |
| *H04W 28/18* | (2009.01) |
| *H04W 72/12* | (2009.01) |
| *H04W 84/18* | (2009.01) |

(52) U.S. Cl.
CPC ........ *H04W 72/082* (2013.01); *H04B 7/2643* (2013.01); *H04B 7/2659* (2013.01); *H04J 3/1694* (2013.01); *H04L 67/1074* (2013.01); *H04W 28/18* (2013.01); *H04W 72/1205* (2013.01); *H04W 84/18* (2013.01)

(58) Field of Classification Search
USPC ............... 370/235–252, 503–508, 329–345; 709/217–229
See application file for complete search history.

(56) References Cited

U.S. PATENT DOCUMENTS

| | | | | |
|---|---|---|---|---|
| 7,489,650 | B2 * | 2/2009 | Ginzburg | H04L 1/0003 370/252 |
| 7,813,385 | B1 * | 10/2010 | Hyun | H04W 56/0015 370/503 |
| 7,876,786 | B2 * | 1/2011 | Bahl | H04L 5/0032 370/344 |
| 8,335,155 | B2 * | 12/2012 | Kim | H04W 74/0833 370/229 |
| 8,780,880 | B2 * | 7/2014 | Lin | H04W 72/1215 370/345 |

(Continued)

*Primary Examiner* — Man Phan
(74) *Attorney, Agent, or Firm* — McClure, Qualey & Rodack, LLP

(57) ABSTRACT

A communications apparatus includes a radio module providing a predetermined wireless communications service and communicating with a peer communications apparatus in a predetermined frequency band in compliance with a predetermined protocol. The radio module includes a processor. The processor determines a maximum packet transmission duration, transmits information regarding the maximum packet transmission duration to the peer communications apparatus and negotiates a preferred packet transmission duration with the peer communications apparatus.

32 Claims, 9 Drawing Sheets

(56) References Cited

U.S. PATENT DOCUMENTS

| | | | |
|---|---|---|---|
| 9,002,981 B2* | 4/2015 | Yu | H04L 67/10 709/217 |
| 9,246,603 B2* | 1/2016 | Fu | H04B 1/1027 |
| 2003/0125037 A1 | 7/2003 | Bae et al. | |
| 2007/0230378 A1 | 10/2007 | Tavares et al. | |
| 2008/0227488 A1 | 9/2008 | Zhu et al. | |
| 2008/0232339 A1 | 9/2008 | Yang et al. | |
| 2009/0196180 A1 | 8/2009 | Bahl et al. | |
| 2009/0213740 A1* | 8/2009 | Ganguly | H04L 41/0896 370/252 |
| 2012/0040715 A1 | 2/2012 | Fu et al. | |
| 2012/0082140 A1 | 4/2012 | Lin et al. | |
| 2012/0207040 A1* | 8/2012 | Comsa | H04W 72/1215 370/252 |
| 2016/0066204 A1* | 3/2016 | Khawer | H04W 24/08 455/500 |
| 2016/0066306 A1* | 3/2016 | Khawer | H04W 72/0446 370/329 |
| 2016/0095009 A1* | 3/2016 | Ling | H04W 16/14 370/329 |

* cited by examiner

METHODS FOR PACKET TRANSMISSION PROTECTION AND COMMUNICATIONS APPARATUS UTILIZING THE SAME

CROSS REFERENCE TO RELATED APPLICATIONS

This application claims the benefit of U.S. Provisional Application No. 61/902,425 filed 2013 Nov. 11 entitled "Interference Mitigation and Performance Improvement for TDMA-Based Long Range Data Communication", the entire contents of which are hereby incorporated by reference.

BACKGROUND OF THE INVENTION

Field of the Invention

The invention relates to packet transmission protection methods, and more particularly to packet transmission protection methods for TDMA-Based long range data communication.

Description of the Related Art

With the development of wireless communications technology, mobile electronic devices may be provided with one or more wireless communications service, such as GSM/GPRS/EDGE (Global System for Mobile Communications/General Packet Radio Service/Enhanced Data rates for Global Evolution), W-CDMA (Wideband Code Division Multiple Access), LTE (Long Term Evolution), Bluetooth, Wireless Fidelity (Wi-Fi), Bluetooth Low Energy (BLE), Bluetooth Long Range (BLR) wireless communications services, and so on.

Generally, different RATs operate in different frequency bands. However, some of them may still operate in a frequency band that is close to or even overlaps with the operating band of other RATs. For example, LTE band 40 (2300 MHz~2400 MHz) is very close to the ISM (Institute for Supply Management) band (2400 MHz~2483.5 MHz), and there is nearly no guard band between the LTE band 40 and the ISM band.

The ISM radio bands (also called ISM band) are radio bands (portions of the radio spectrum) reserved internationally for the use of radio frequency (RF) energy for industrial, scientific and medical purposes other than telecommunications. The wireless communications services currently operating on the ISM radio bands include the Bluetooth, BLE, BLR and Wi-Fi.

In this regard, the overlapping or adjacent operating frequency band among the different wireless communications services causes the transmission and reception performance thereof to degrade, especially those wireless communications services using Time Division Multiple Access (TDMA) technology not applying any collision avoidance mechanism.

Therefore, a communications apparatus capable of mitigating interference in a TDMA-Based wireless communications system is highly desired.

BRIEF SUMMARY OF THE INVENTION

Communications apparatuses and methods for packet transmission protection are provided. An exemplary embodiment of a communications apparatus comprises a radio module providing a predetermined wireless communications service and communicating with a peer communications apparatus in a predetermined frequency band in compliance with a predetermined protocol. The radio module comprises a processor. The processor determines a maximum packet transmission duration, transmits information regarding the maximum packet transmission duration to the peer communications apparatus and negotiates a preferred packet transmission duration with the peer communications apparatus.

An exemplary embodiment of a method for packet transmission protection comprises: determining a maximum packet transmission duration by a first communications apparatus; transmitting information regarding the maximum packet transmission duration to a second communications apparatus; and negotiating a preferred packet transmission duration by the first communications apparatus with the second communications apparatus.

An exemplary embodiment of a communications apparatus comprises a first radio module providing a first wireless communications service in a predetermined frequency band in compliance with a first protocol and a second radio module providing a second wireless communications service in the predetermined frequency band in compliance with a second protocol. When the first radio module determines that a packet transmission is to be performed, the first radio module informs the second radio module information regarding the packet transmission to be performed. The second radio module transmits a predetermined message according to the information regarding the packet transmission in the predetermined frequency band to activate a protection scheme.

An exemplary embodiment of a method for packet transmission protection of a communications apparatus comprising a first radio module providing a first wireless communications service in a predetermined frequency band in compliance with a first protocol and a second radio module providing a second wireless communications service in the predetermined frequency band in compliance with a second protocol comprises: determining whether a packet transmission of the first radio module is to be performed; informing the second radio module information regarding the packet transmission when the packet transmission of the first radio module is to be performed; and transmitting a predetermined message according to the information regarding the packet transmission in the predetermined frequency band by the second radio module to activate a protection scheme.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
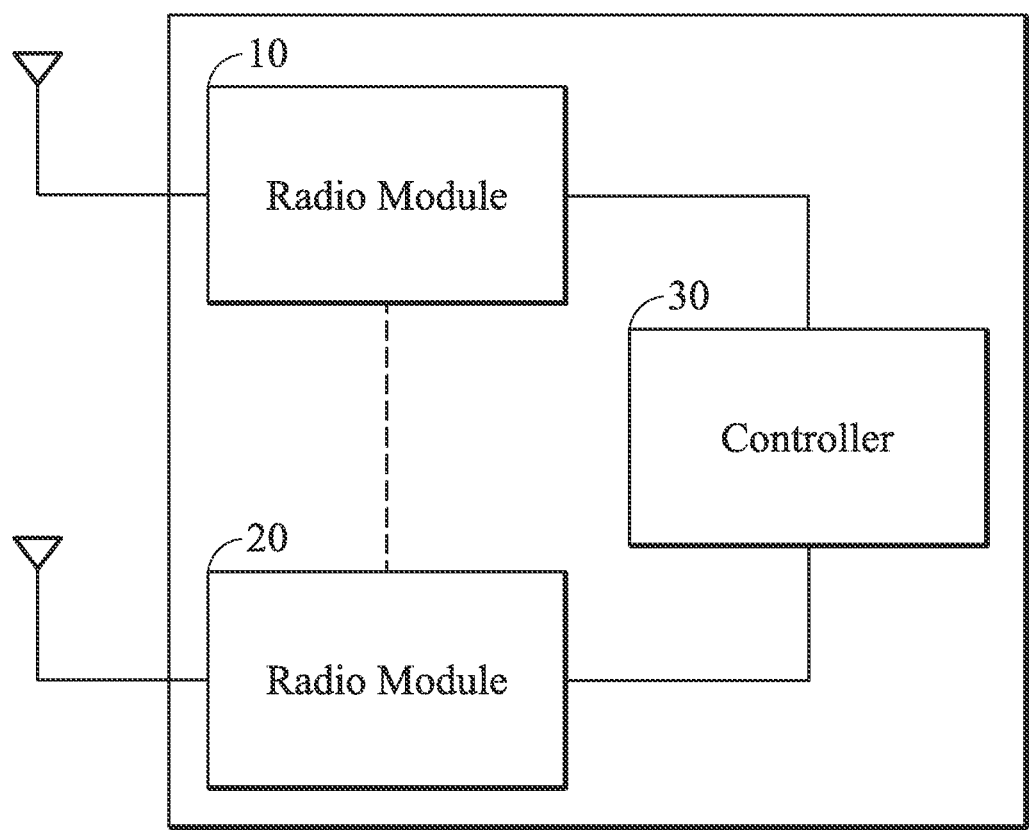
FIG. 1 shows a block diagram of a communications apparatus according to an embodiment of the invention.

FIG. 1 shows a block diagram of a communications apparatus according to an embodiment of the invention. The communications apparatus 100 may comprise one or more than one radio modules, such as radio modules 10 and 20 as shown. Each radio module is arranged to provide a predetermined wireless communications service and may communicate with a peer communications apparatus (for example, a base station, a node-B, an eNB, an access point, or any other communications device) in a corresponding wireless network in compliance with a predetermined protocol of a predetermined Radio Access Technology (RAT).

According to an embodiment of the invention, the communications apparatus 100 may further comprise a controller 30. The controller 30 is coupled to the one or more radio modules, such as the radio modules 10 and 20, and may control operations of the communications apparatus 100 and the one or more radio modules.

Note that FIG. 1 shows only an exemplary block diagram of the proposed communications apparatus to give a clear illustration of the concept of the invention. In the embodiments of the invention, the number of radio modules comprised in the communications apparatus 100 is not limited to the number shown in FIG. 1. As illustrated above, in the embodiments of the invention, the communications apparatus may comprise only one or more than one radio modules.

In addition, note that FIG. 1 is a simplified block diagram of the proposed communications apparatus to give a clear illustration of the concept of the invention. In other embodiments of the invention, the communications apparatus 100 may further comprise other hardware modules and/or components not shown in FIG. 1, and the invention should not be limited to what is shown in FIG. 1.

In addition, note that in some embodiments of the invention, the controller 30 may also be integrated into one radio module as the processor thereof, or there may be no controller 30 comprised in the proposed communications apparatus, and the invention should not be limited to any specific implementation method.

In addition, note further that, in the embodiments of the invention, when the communications apparatus 100 comprises more than one radio modules, the radio modules may be implemented in different chips and communicate with each other via a specific interface disposed therebetween, or may be integrated into one chip, such as an SoC (system on chip), and connect to each other by internal wires. Therefore, the invention should not be limited to any specific implementation method.

In the embodiments of the invention, the communications apparatus 100 may be a notebook computer, a cellular phone, a portable gaming device, a portable multimedia player, a tablet computer, a Global Positioning System (GPS) receiver, a Personal Digital Assistant (PDA), or others. In addition, in the embodiments of the invention, the radio module(s) comprised in or the radio modules colocated in the communications apparatus 100 may include a Wi-Fi module, a Bluetooth module, a 2G/3G/4G or LTE module, a BLE module, a BLR module, or others, for providing the corresponding communications services in compliance with the corresponding protocols.

Figure 2:
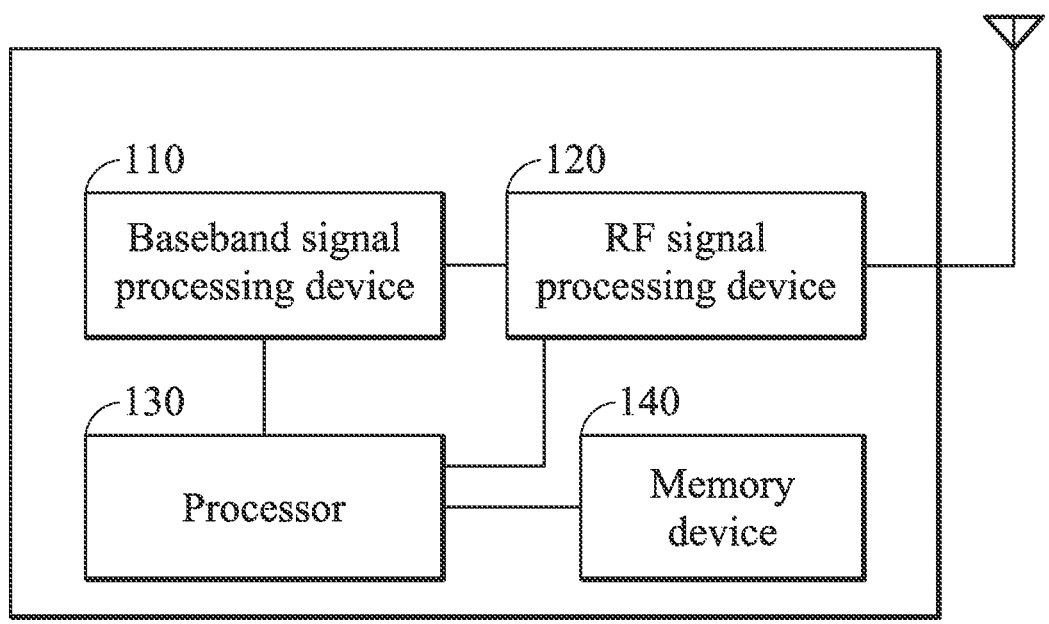
FIG. 2 shows a block diagram of a radio module according to an embodiment of the invention.

FIG. 2 shows a block diagram of a radio module according to an embodiment of the invention. The radio module 200 may comprise at least a baseband signal processing device 110, a radio frequency (RF) signal processing device 120, a processor 130, a memory device 140, and an antenna module comprising at least one antenna. Note that, in order to clarify the concept of the invention, FIG. 2 presents a simplified block diagram in which only the elements relevant to the invention are shown. However, the invention should not be limited to what is shown in FIG. 2. For example, in some embodiments of the invention, the radio module 200 may further be extended to comprise more than one antenna, and the invention should not be limited to what is shown in FIG. 2.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The RF signal processing device 120 may comprise a plurality of hardware elements to perform radio frequency conversion. For example, the RF signal processing device 120 may comprise a power amplifier, a mixer, or others.

The baseband signal processing device 110 may process (for example, decode and demodulate) the baseband signals corresponding to the RF signals processed by the RF signal processing device 120 to obtain information or data transmitted by the peer communications apparatus, and may process (for example, encode and modulate) uplink data to be transmitted to the peer communications apparatus as the baseband signals and provide the baseband signals to the RF signal processing device 120. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 130 may control the operations of the baseband signal processing device 110, the RF signal processing device 120 and the memory device 140. According to an embodiment of the invention, the processor 130 may also be arranged to execute the program codes of the software module(s) of the corresponding baseband signal processing device 110 and/or the RF signal processing device 120. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s). The memory device 140 may store the software and firmware program codes, system data, user data, etc. of the radio module 200.

Among the wireless communications services using Time Division Multiple Access (TDMA) technology in the industrial, scientific and medical (ISM) radio band, some wireless communications services have no collision avoidance mechanism. For example, for the Bluetooth, Bluetooth Low Energy (BLE module) and Bluetooth Long Range (BLR), there is no carrier sensing and collision avoidance (such as the Carrier sense multiple access with collision avoidance (CSMA/CA)) applied. Therefore, packet collisions may happen easily when the ISM band is full of interference. Here, the interference may be caused by the transmission of any communications apparatus in the ISM radio band to the communications apparatus (such as the communications apparatus 100), or may be caused by the transmission of one radio module of a communications apparatus to another radio module co-located in the same communications apparatus (such as the communications apparatus 100). In order to mitigate interference in the TDMA-Based wireless communications system for such wireless communications services not applying collision avoidance mechanism (such as the Bluetooth, BLE and BLR), several methods for packet transmission protection are proposed.

According to a first embodiment of the invention, a communications apparatus (such as the communications apparatus 100) may negotiate maximum packet transmission duration with another communications apparatus (or called a peer communications apparatus) for interference mitigation and transmission/reception performance improvement.

Figure 3:
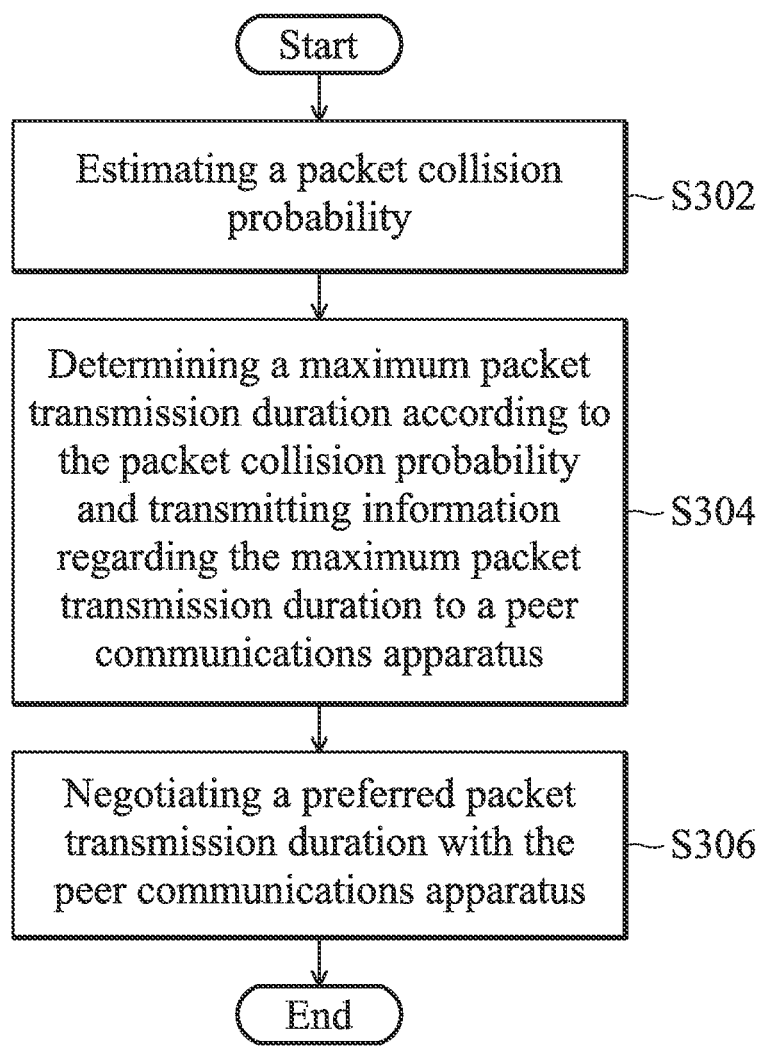
FIG. 3 is a flow chart of a method for packet transmission protection according to a first embodiment of the invention.

FIG. 3 is a flow chart of a method for packet transmission protection according to a first embodiment of the invention. Suppose that data transmission is about to be performed between two communications apparatuses (such as a first communications apparatus and a second communications apparatus) in a wireless communications system, the method as will be illustrated may be performed among the two communications apparatuses to protect the forthcoming packet transmission therebetween.

First of all, a first communications apparatus and a second communications apparatus may respectively estimate a packet collision probability (Step S302). The packet collision probability estimation may be performed by a processor (such as the processor 130) comprised in the corresponding communications apparatus. For example, the first communications apparatus may estimate that the collision probability is 15% when transmission duration of a packet (that is, the time required for transmitting the packet) is 2 ms, and the collision probability is 40% when transmission duration of a packet is 4 ms. For another example, the second communications apparatus may estimate the collision probability is 21% when transmission duration of a packet is 8 ms, and the collision probability is 48% when transmission duration of a packet is 12 ms.

According to an embodiment of the invention, the packet collision probability may be estimated according to statistic of inter-arrival time of a plurality of packets transmitted in the wireless communications system, such as the ISM radio band, within an observation window. For example, one communications apparatus may keep silence (that is, not transmitting any packet) and monitor the traffic in the wireless communications system to record the inter-arrival time of a plurality of packets transmitted in the wireless communications system within an observation window, and analyze the observed inter-arrival time to obtain a statistic result. Here, the inter-arrival time refers to an interval within which no packet is transmitted.

Figure 4:
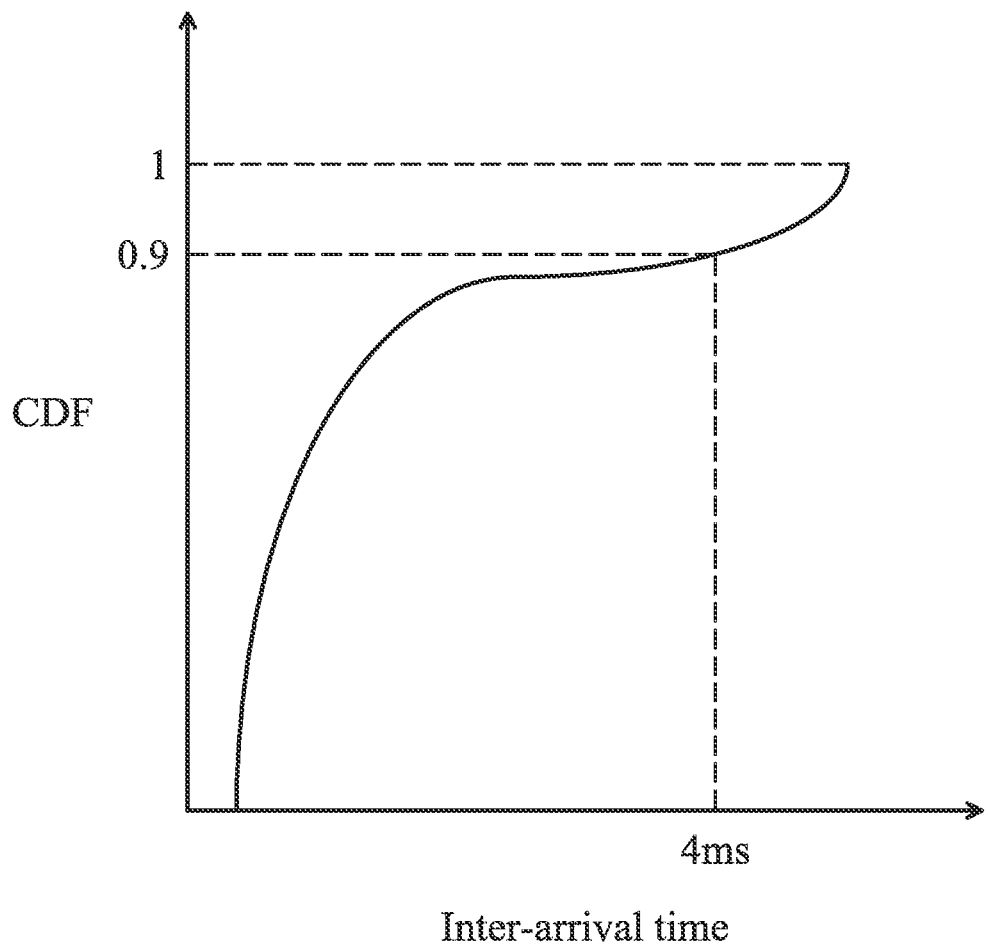
FIG. 4 shows an exemplary cumulative distribution function (CDF) diagram of the inter-arrival time of a plurality of packets transmitted in the wireless communications system and observed by one communications apparatus within an observation window according to an embodiment of the invention.

FIG. 4 shows an exemplary cumulative distribution function (CDF) diagram of the inter-arrival time of a plurality of packets transmitted in the wireless communications system and observed by one communications apparatus within an observation window according to an embodiment of the invention. As shown in FIG. 4, the probability of inter-arrival time of the packets transmitted in the wireless communications system not exceeding 4 ms is 90%. In other words, the collision probability would be 10% when transmission duration (that is, the time required for transmitting the packet) of a packet is greater than 4 ms.

According to another embodiment of the invention, the packet collision probability may also be estimated according to the experiment results. For example, one communications apparatus may transmit packets and estimate the packet collision probability for different packet transmission durations. Note that the methods for estimating the packet collision probability as illustrated above are merely two possible implementations of the invention. As is well-known in the art, there should be a variety of methods for estimating the packet collision probability. Therefore, the invention should not be limited to any specific implementation method.

Next, the first communications apparatus and the second communications apparatus may respectively determine a maximum packet transmission duration according to the packet collision probability and transmitting information regarding the maximum packet transmission duration to the other side (Step S304). The maximum packet transmission duration determination and the information transmission may be performed by the processor comprised in the corresponding communications apparatus. Note that in some embodiments of the invention, the step S302 may also be replaced by the first and/or second communications apparatus determine a packet scheduling requirement for different devices in the predetermined frequency band, or the first and/or second communications apparatus determine a time division multiplexing for different devices in the predetermined frequency band. Therefore, the step S304 may also be replaced by the first and/or second communications apparatus determine a maximum packet transmission duration according to the packet scheduling requirement, or the first and/or second communications apparatus determine a maximum packet transmission duration according to the time division multiplexing, accordingly.

According to an embodiment of the invention, the maximum packet transmission duration is utilized to limit transmission duration of a packet to be transmitted by the peer communications apparatus receiving the information regarding the maximum packet transmission duration. For example, the first communications apparatus may send a request comprising information regarding maximum packet transmission duration, such as 2 ms, to the second communications apparatus, so as to limit transmission duration of a packet to be transmitted by the second communications apparatus to be no more than 2 ms in time domain. Similarly, the second communications apparatus may also send a request comprising information regarding maximum packet transmission duration, such as 8 ms, to the first communications apparatus, so as to limit transmission duration of a packet to be transmitted by the first communications apparatus to be no more than 8 ms.

Finally, the first communications apparatus may negotiate a preferred packet transmission duration with the second communications apparatus, and the second communications apparatus may negotiate a preferred packet transmission duration with the first communications apparatus (Step S306).

According to an embodiment of the invention, after receiving information regarding the maximum packet transmission duration determined by the peer communications apparatus, the processor of the communications apparatus may further determine the preferred packet transmission duration according to the maximum packet transmission duration determined by the peer communications apparatus.

According to an embodiment of the invention, the preferred packet transmission duration is utilized to limit transmission duration of a packet to be transmitted by the communications apparatus itself. For example, after negotiation, the preferred packet transmission duration of the first communications apparatus may be determined as 8 ms, so as to limit transmission duration of a packet to be transmitted by the first communications apparatus to the second communications apparatus to be no more than 8 ms. Similarly, after negotiation, the preferred packet transmission duration of the second communications apparatus may be determined as 2 ms, so as to limit transmission duration of a packet to be transmitted by the second communications apparatus to the first communications apparatus to be no more than 2 ms.

Figure 5A:
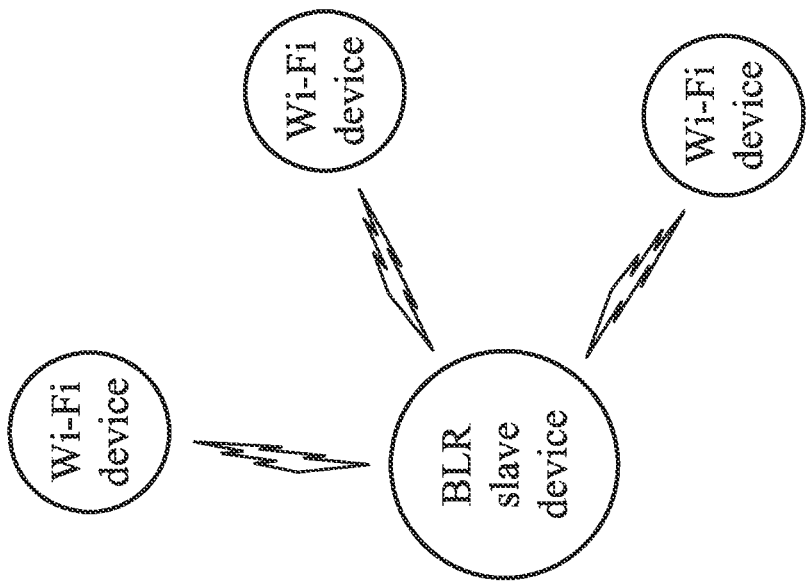
FIG. 5A-5C show an exemplary scenario implementing the proposed method for packet transmission protection according to the first embodiment of the invention.
Figure 5A:
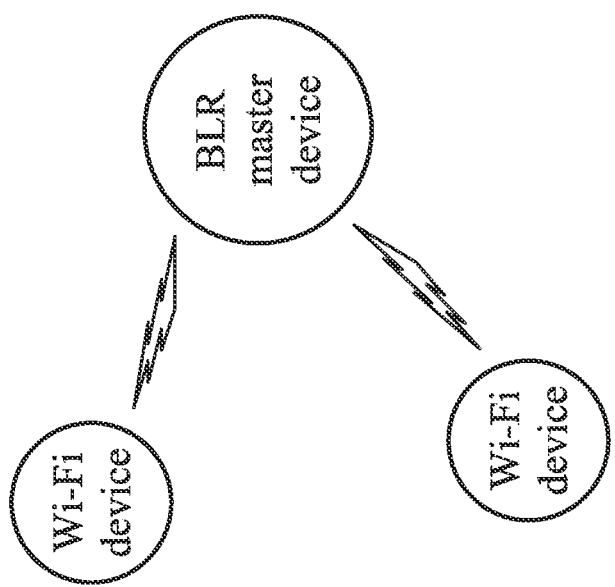
Figure 5B:
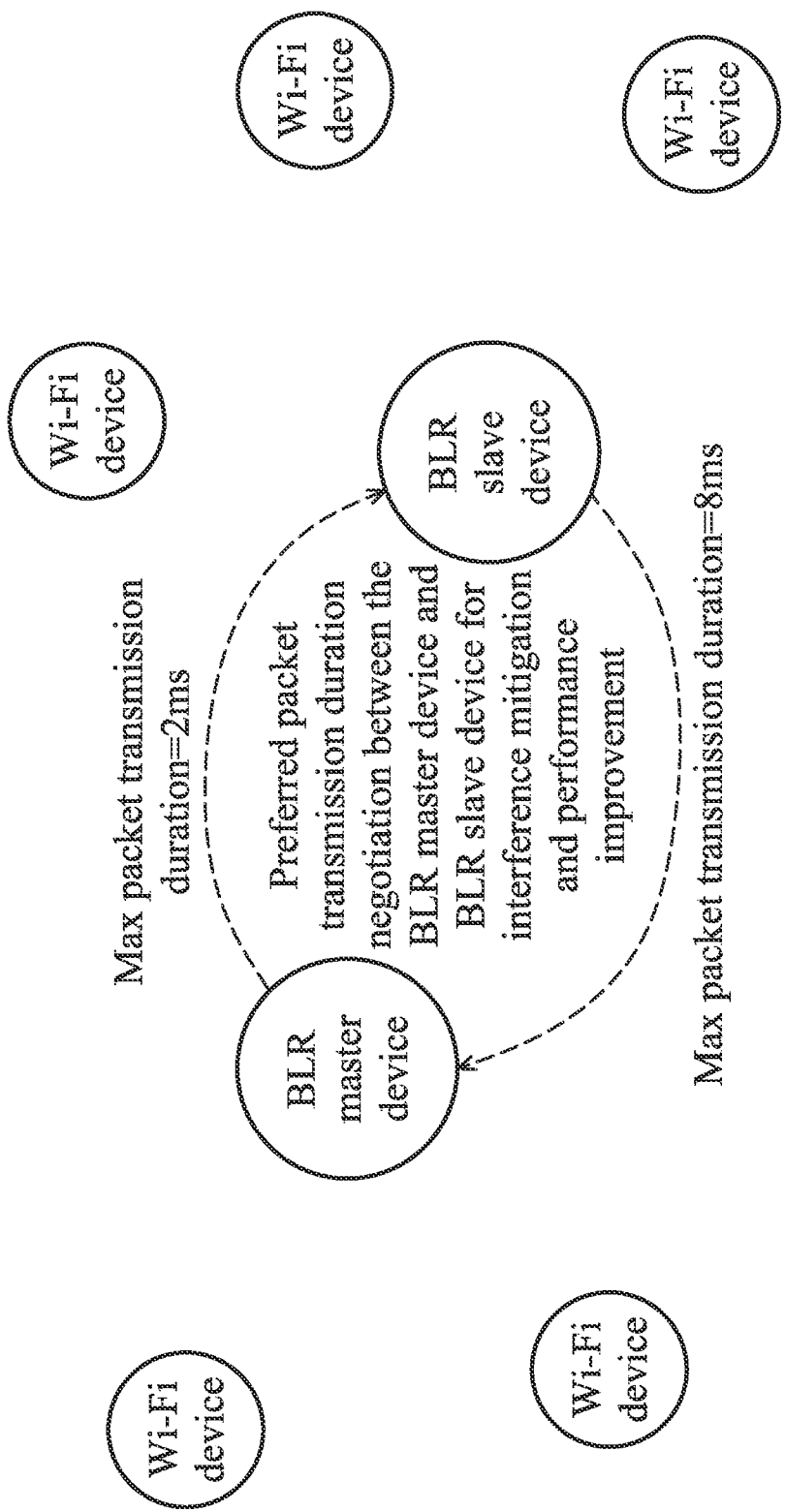
Figure 5C:
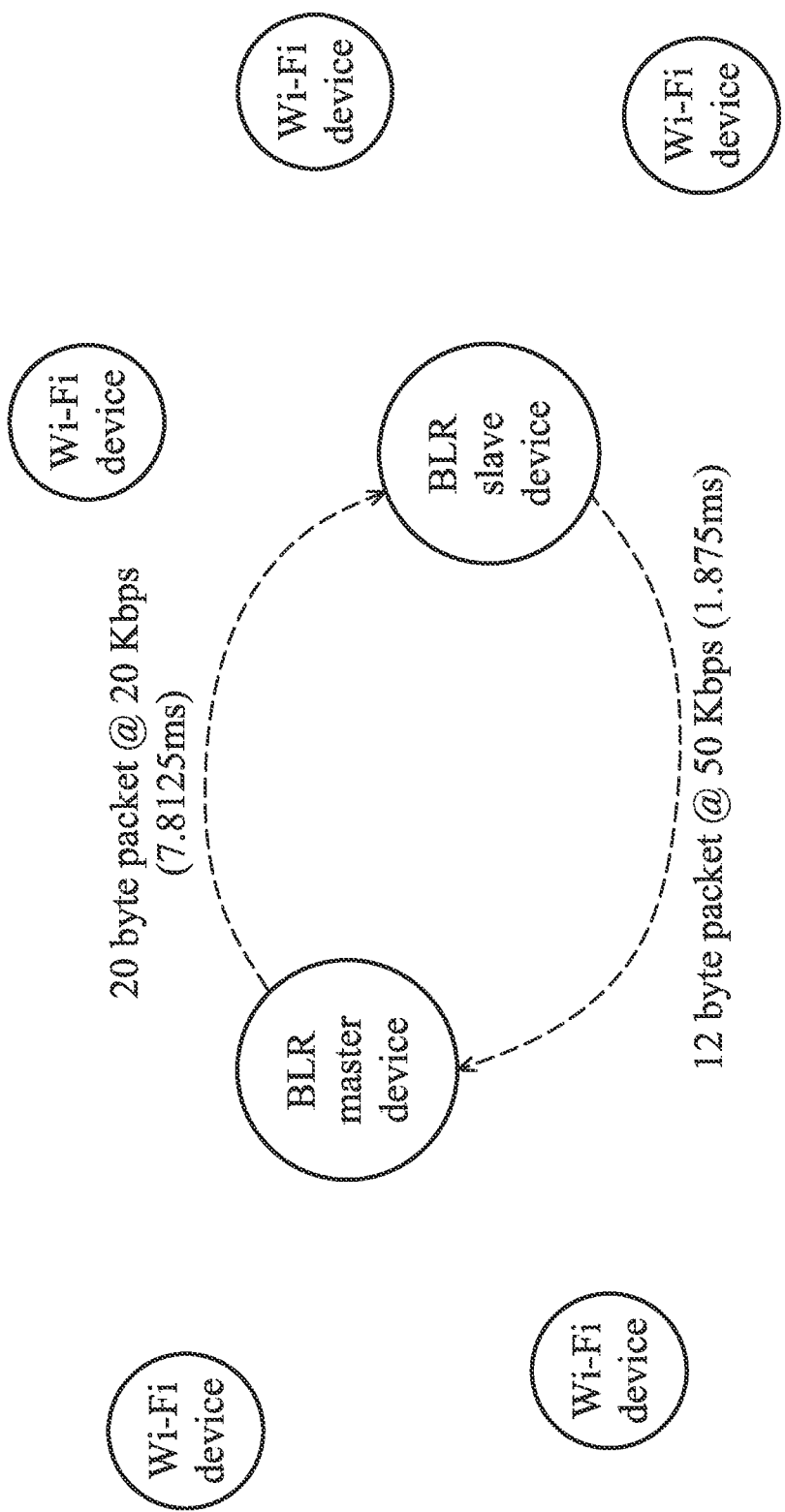

FIG. 5A-5C show an exemplary scenario implementing the proposed method for packet transmission protection according to the first embodiment of the invention. As shown in FIG. 5A, in the example, two BLR devices, including a BLR master device and a BLR slave device, may perform the proposed method for protecting packet transmission in the wireless communications system full of interference (such as the interference from the surrounding Wi-Fi devices as shown) before performing data transmission. The BLR master device and the BLR slave device each may first estimate a packet collision probability.

Next, as shown in FIG. 5B, preferred packet transmission duration negotiation may be performed by the two BLR devices for interference mitigation and performance improvement. For example, the BLR master device may limit the maximum packet transmission duration of the BLR slave device as 2 ms according to the estimated packet collision probability and transmit information regarding the maximum packet transmission duration to the BLR slave device. The BLR slave device may also limit the maximum packet transmission duration of the BLR master device as 8 ms according to the estimated packet collision probability and transmit information regarding the maximum packet transmission duration to the BLR master device. Upon receiving information regarding the maximum packet transmission duration, each device may further determine its preferred packet transmission duration according to the maximum packet transmission duration requested by the other side.

Finally, as shown in FIG. 5C, the BLR master device and BLR slave device may respectively determine a packet size of a packet to be transmitted to the peer side and/or a data rate utilized for transmitting the packet according to the preferred packet transmission duration thereof, and the data transmission may begin. For example, the BLR master device may transmit a 20 byte packet at 20 Kbps to the BLR slave device, such that transmission duration of the packet is 7.8125 ms, which is less than 8 ms as requested by the BLR slave device. The BLR slave device may transmit a 12 byte packet at 50 Kbps to the BLR master device, such that transmission duration of the packet is 1.875 ms, which is less than 2 ms as requested by the BLR master device.

In this manner, interference mitigation and performance improvement can be achieved.

According to an embodiment of the invention, for a RAT using fixed data rate, the packet size of a packet to be transmitted may be determined directly according to preferred packet transmission duration. For example, the relationship between the packet size, data rate and packet transmission duration is derived as below:

$$T_{TX} = Pkt\_size/Data\_rate \qquad \text{Eq. (1)}$$

where $T_{TX}$ represents the packet transmission duration, Pkt_size represents the packet size and the Data_rate represents the data rate utilized for transmitting the packet. Therefore, when the data rate is fixed, the packet size of a packet to be transmitted may be determined directly according to preferred packet transmission duration and the fixed data rate.

According to another embodiment of the invention, for a RAT using a variable data rate, the communications apparatus may first determine a preferred data rate (or a preferred packet size), and then determine the packet size (or the data rate) according to the preferred packet transmission duration, the preferred data rate (or the preferred packet size) and the relationship shown in Eq. (1), so as to meet the required preferred packet transmission duration.

For example, the processor of the communications apparatus may determine the preferred data rate according to a suggested data rate suggested by the peer communications apparatus. Information regarding the suggested data rate may be transmitted by the peer communications apparatus during the preferred packet transmission duration negotiation.

In one embodiment of the invention, when determining the suggested data rate, a factor of receiving sensitivity requirement can be taken into consideration. Table 1 shows an exemplary relationship between the data rate, packet transmission duration and receiving sensitivity requirement.

TABLE 1 relationship between the data rate, packet transmission duration and receiving sensitivity requirement

| Data rate (Kbps) | Packet transmission duration (ms) | Receiving sensitivity (dBm) |
| --- | --- | --- |
| 1000 | (23 * 8/(1000 * 1024)) * 1000 = 0.1798 | −94 |
| 200 | (23 * 8/(200 * 1024)) * 1000 = 0.898 | −101 |
| 100 | (23 * 8/(100 * 1024)) * 1000 = 1.798 | −104 |
| 50 | (23 * 8/(50 * 1024)) * 1000 = 3.59 | −107 |
| 20 | (23 * 8/(20 * 1024)) * 1000 = 8.98 | −110 |
| 10 | (23 * 8/(10 * 1024)) * 1000 = 17.98 | −114 |

Since the data rate generally relates to the receiving sensitivity requirement, one communications apparatus may determine the suggested data rate according to its receiving sensitivity requirement.

For another example, the processor of the communications apparatus may determine the preferred data rate according to reception results of one or more packets previously transmitted to the peer communications apparatus. Information regarding the reception results may be provided by the peer communications apparatus during the preferred packet transmission duration negotiation, or the communications apparatus may obtain the information regarding the reception results of the peer communications apparatus by recording the number of ACK and NACK received from the peer communications apparatus.

Note that in some embodiments of the invention, since the transmission channel is a time-varying channel, the estimated packet collision probability may be updated periodically or non-periodically. For example, each communications apparatus may perform the collision probability estimation as illustrated above periodically or non-periodically, so as to update the estimated packet collision probability. In another example, each communications apparatus may update the packet collision probability according to the actual packet collision rate occurred during the data transmission.

In yet another example, the maximum packet transmission duration and/or preferred packet transmission duration may also be updated periodically or non-periodically according to the actual packet collision occurred during the data transmission. For example, when the actual packet collision rate is lower than a predetermined threshold, the maximum packet transmission duration/preferred packet transmission duration may be increased, and when the actual packet collision rate is greater than a predetermined threshold, the maximum packet transmission duration/preferred packet transmission duration may be decreased.

Once the estimated packet collision probability, the maximum packet transmission duration and/or preferred packet transmission duration has/have been changed, the negotiation procedure as illustrated should be triggered again for the parameter update.

According to a second embodiment of the invention, for a communications apparatus (such as the communications apparatus 100) equipped with more than one radio module, one radio module (e.g. a second radio module) may activate a protection scheme for another radio module (e.g. a first radio module) to protect data transmission and avoid collision for that radio module (e.g. the first radio module). Note that in the embodiments of the invention, both the first radio module and the second radio module may operate (for example, performing its transmitting and receiving activities) in the predetermined frequency band. According to an embodiment of the invention, the predetermined frequency band may be the ISM radio band.

Figure 6:
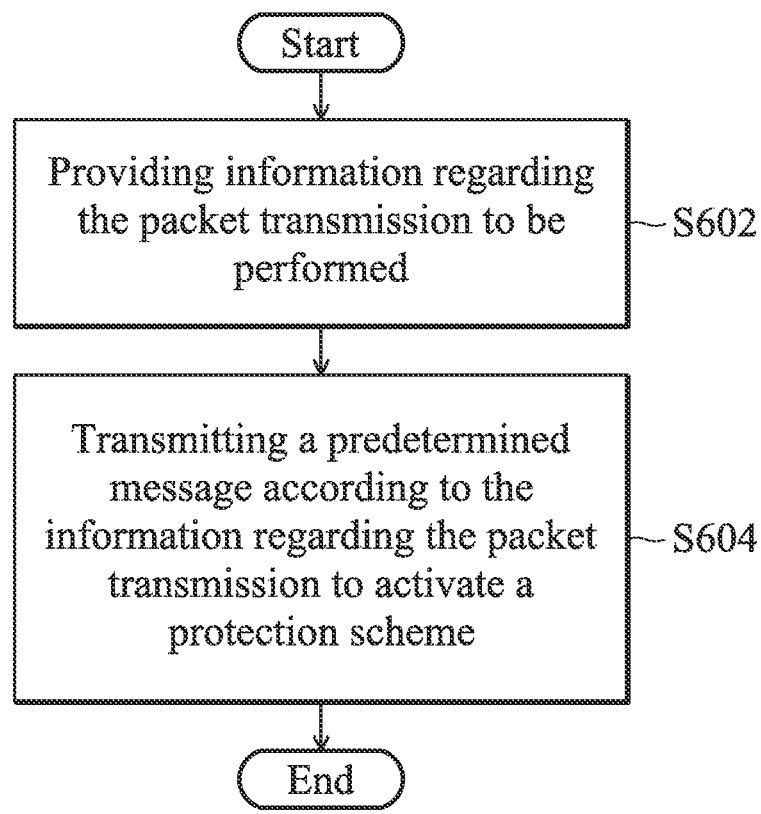
FIG. 6 is a flow chart of a method for packet transmission protection according to a second embodiment of the invention.

FIG. 6 is a flow chart of a method for packet transmission protection according to a second embodiment of the invention. According to the second embodiment of the invention, when the first radio module determines that a packet transmission is to be performed, the first radio module may inform the second radio module or provide the second radio module information regarding the packet transmission (Step S602). Upon obtaining information regarding the packet transmission of the first radio module, the second radio module may transmit a predetermined message according to the information regarding the packet transmission in the predetermined frequency band to activate a protection scheme (Step S604).

In this manner, interference mitigation and performance improvement can be achieved.

According to an embodiment of the invention, the second radio module may initiate a clear to send to self (CTS2self) messaging procedure to activate the protection scheme, and the predetermined message may be a clear to send (CTS) message.

According to an embodiment of the invention, the information regarding the packet transmission of the first radio module may comprise a channel in which the packet transmission is to be performed and a time interval, such as the duration and/or the start time, required for performing the packet transmission. Upon receiving the information regarding the packet transmission, the second radio module may transmit the predetermined message in the channel, so as to mute the other communications device(s) operating in the channel for that time interval.

After the second radio module transmitting the predetermined message to activate the protection scheme, there is not supposed to be any data or signals transmitted from a peer communications apparatus associated with the second radio module to the second radio module in the channel. In this manner, the second radio module may stop its receiving activities. In addition, for collision avoidance, the second radio module may further stop its transmitting activities. Here, the receiving/transmitting activities may comprise receiving/transmitting any data and/or signals.

Figure 7:
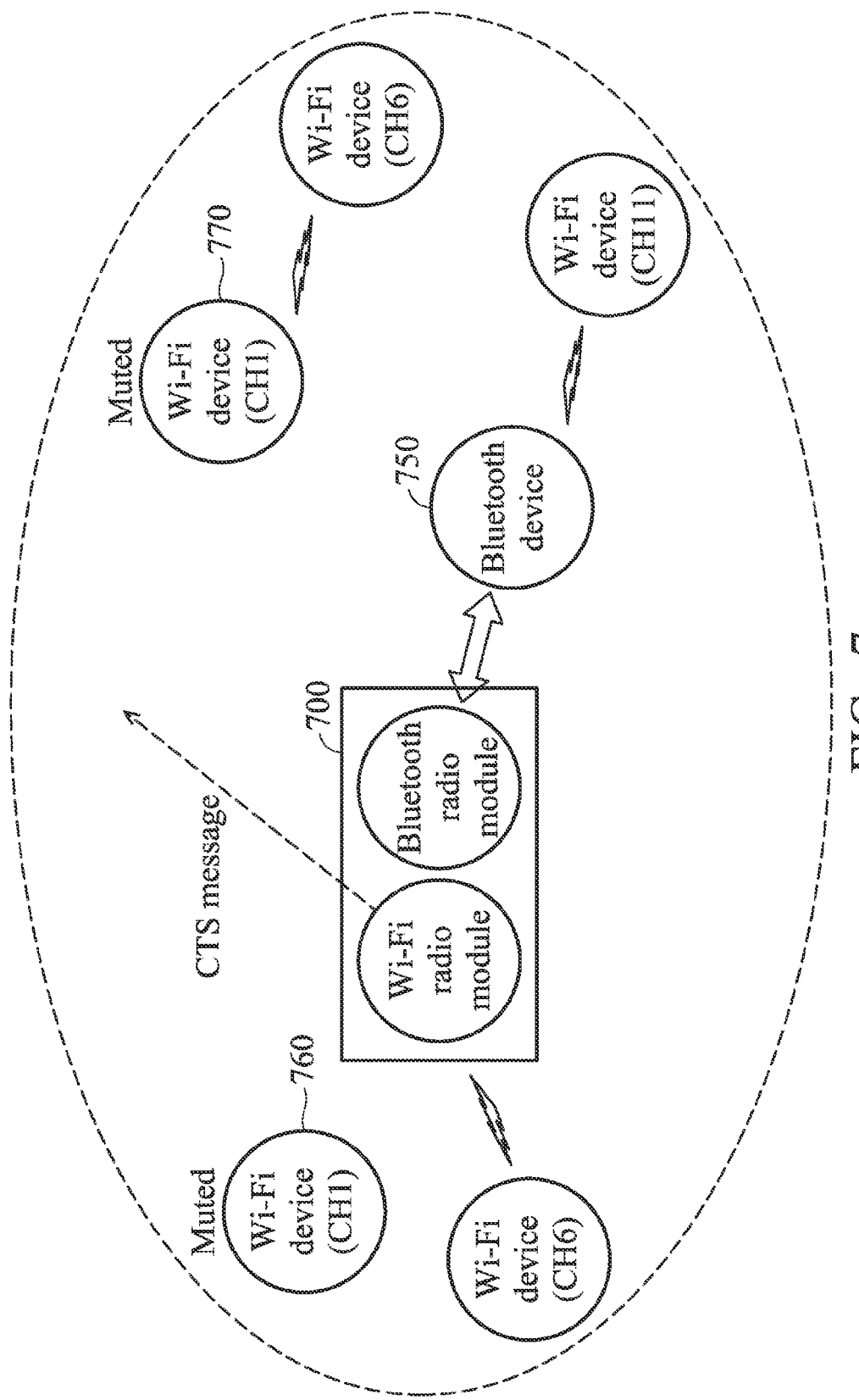
FIG. 7 shows an exemplary scenario implementing the proposed method for packet transmission protection according to the second embodiment of the invention.

FIG. 7 shows an exemplary scenario implementing the proposed method for packet transmission protection according to the second embodiment of the invention. Suppose that the communications apparatus 700 comprises at least a Wi-Fi radio module and a Bluetooth radio module co-located therein. The Bluetooth radio module may communicate with another Bluetooth device 750 in the wireless communications system and the Wi-Fi radio module may currently operate in channel 1.

When the Bluetooth radio module determines that a packet transmission is to be performed, the Bluetooth radio module may inform the Wi-Fi radio module or provide the Wi-Fi radio module information regarding the packet transmission. Upon obtaining information regarding the packet transmission of the Bluetooth radio module, the Wi-Fi radio module may transmit a CTS message in channel 1 to temporarily mute the transmissions in Wi-Fi channel 1. Upon receiving the CTS message, the Wi-Fi devices currently operating in channel 1, such as the Wi-Fi devices 760 and 770, are muted and there is supposed to be no data or signal transmitted therefrom. In this manner, for the duration when the Bluetooth radio module plans to perform packet and/or data transmission, the corresponding channel and frequency band is clean and there would be no interference and collision.

According to another aspect of the second embodiment of the invention, which is different from the one illustrated above, the protection scheme may also be actively activated by the co-located radio module. For example, in one embodiment of the invention, the second radio module (such as the Wi-Fi radio module shown in FIG. 7) may keep monitoring the communications channel, and inform the first radio module (such as the Bluetooth radio module shown in FIG. 1) about the availability of the communications channel. When the communications channel is idle, the first radio module may perform packet and/or data transmission.

In this manner, interference mitigation and performance improvement can be achieved.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a radio circuit, providing a predetermined wireless communications service and communicating with a peer communications apparatus in a predetermined frequency band in compliance with a predetermined protocol,
   wherein the radio circuit comprises a processor, the processor determines a maximum packet transmission duration, transmits information regarding the maximum packet transmission duration to the peer communications apparatus and negotiates a preferred packet transmission duration with the peer communications apparatus,
   wherein the processor further determines a data rate, and determines a packet size of a packet to be transmitted to the peer communications apparatus according to the preferred packet transmission duration and the data rate.

2. The communications apparatus as claimed in claim 1, wherein the processor further estimates a packet collision probability in the predetermined frequency band, and determines the maximum packet transmission duration according to the packet collision probability.

3. The communications apparatus as claimed in claim 1, wherein the processor further determines a packet scheduling requirement for different devices in the predetermined frequency band, and determines the maximum packet transmission duration according to the packet scheduling requirements.

4. The communications apparatus as claimed in claim 1, wherein the processor further determines a time division multiplexing for different devices in the predetermined frequency band, and determines the maximum packet transmission duration according to the packet scheduling requirements.

5. The communications apparatus as claimed in claim 2, wherein the packet collision probability is estimated according to a statistic of inter-arrival time of a plurality of packets transmitted in the predetermined frequency band within an observation window.

6. The communications apparatus as claimed in claim 1, wherein the processor transmits the information regarding the maximum packet transmission duration to the peer communications apparatus to limit transmission duration of a packet to be transmitted by the peer communications apparatus to the communications apparatus.

7. The communications apparatus as claimed in claim 1, wherein when negotiating the preferred packet transmission duration with the peer communications apparatus, the processor further receives information regarding a maximum packet transmission duration determined by the peer communications apparatus from the peer communications apparatus, and the processor determines the preferred packet transmission duration according to the maximum packet transmission duration determined by the peer communications apparatus.

8. The communications apparatus as claimed in claim 1, wherein after negotiating the preferred packet transmission duration, transmission duration of a packet to be transmitted to the peer communications apparatus is limited and no more than the preferred packet transmission duration.

9. The communications apparatus as claimed in claim 1, wherein the processor further determines a packet size of a packet to be transmitted to the peer communications apparatus according to the preferred packet transmission duration.

10. The communications apparatus as claimed in claim 1, wherein the processor determines the data rate according to a suggested data rate suggested by the peer communications apparatus.

11. The communications apparatus as claimed in claim 1, wherein the processor determines the data rate according to reception results of one or more packets previously transmitted to the peer communications apparatus.

12. The communications apparatus as claimed in claim 1, wherein the predetermined frequency band is the industrial, scientific and medical (ISM) radio band.

13. A method for packet transmission protection, comprising:
    determining a maximum packet transmission duration by a first communications apparatus;
    transmitting information regarding the maximum packet transmission duration to a second communications apparatus;
    negotiating a preferred packet transmission duration by the first communications apparatus with the second communications apparatus;
    determining a data rate by the first communications apparatus; and
    determining a packet size of a packet to be transmitted to the second communications apparatus by the first communications apparatus according to the preferred packet transmission duration and the data rate.

14. The method as claimed in claim 13, further comprising:
    estimating a packet collision probability in a predetermined frequency band by the first communications apparatus,
    wherein the maximum packet transmission duration is determined according to the packet collision probability.

15. The method as claimed in claim 13, further comprising:
    determining a packet scheduling requirement for different devices in a predetermined frequency band by the first communications apparatus,
    wherein the maximum packet transmission duration is determined according to the packet scheduling requirements.

16. The method as claimed in claim 13, further comprising:
    determining a time division multiplexing for different devices in a predetermined frequency band by the first communications apparatus,
    wherein the maximum packet transmission duration is determined according to the time division multiplexing.

17. The method as claimed in claim 14, wherein the packet collision probability is estimated according to statistic of inter-arrival time of a plurality of packets transmitted in the predetermined frequency band within an observation window.

18. The method as claimed in claim 13, wherein transmission duration of a packet to be transmitted by the second communications apparatus to the first communications apparatus is limited and no more than the maximum packet transmission duration determined by the first communications apparatus.

19. The method as claimed in claim 13, wherein the step of negotiating the preferred packet transmission duration further comprises:
receiving information regarding a maximum packet transmission duration determined by the second communications apparatus from the second communications apparatus; and
determining the preferred packet transmission duration according to the maximum packet transmission duration determined by the second communications apparatus.

20. The method as claimed in claim 13, wherein after negotiating the preferred packet transmission duration, transmission duration of a packet to be transmitted by the first communications apparatus to the second communications apparatus is limited and no more than the preferred packet transmission duration.

21. The method as claimed in claim 13, further comprising:
determining a packet size of a packet to be transmitted to the second communications apparatus by the first communications apparatus according to the preferred packet transmission duration.

22. The method as claimed in claim 13, further comprising:
receiving information regarding a suggested data rate suggested by the second communications apparatus,
wherein the data rate is determined according to the suggested data rate.

23. The method as claimed in claim 13, wherein the data rate is determined according to reception results of one or more packets previously transmitted by the first communications apparatus to the second communications apparatus.

24. The method as claimed in claim 22, wherein the predetermined frequency band is the industrial, scientific and medical (ISM) radio band.

25. A communications apparatus, comprising:
a first radio circuit, providing a first wireless communications service in a predetermined frequency band in compliance with a first protocol; and
a second radio circuit, providing a second wireless communications service in the predetermined frequency band in compliance with a second protocol,
wherein when the first radio circuit determines that a packet transmission is to be performed, the first radio circuit provides the second radio circuit information regarding the packet transmission to be performed,
wherein the second radio circuit transmits a predetermined message according to the information regarding the packet transmission in the predetermined frequency band to activate a protection scheme, and
wherein the information regarding the packet transmission comprises a channel in which the packet transmission is to be performed and a time interval required for performing the packet transmission, and wherein the second radio circuit transmits the predetermined message in the channel.

26. The communications apparatus as claimed in claim 25, wherein the second radio circuit stops receiving any data or signals after transmitting the predetermined message.

27. The communications apparatus as claimed in claim 25, wherein the second radio circuit stops transmitting any data or signal after transmitting the predetermined message.

28. The communications apparatus as claimed in claim 25, wherein the predetermined message is a clear to send (CTS) message.

29. The communications apparatus as claimed in claim 25, wherein the predetermined frequency band is the industrial, scientific and medical (ISM) radio band.

30. A method for packet transmission protection of a communications apparatus comprising a first radio circuit providing a first wireless communications service in a predetermined frequency band in compliance with a first protocol and a second radio circuit providing a second wireless communications service in the predetermined frequency band in compliance with a second protocol, comprising:
determining whether a packet transmission of the first radio circuit is to be performed;
informing the second radio circuit information regarding the packet transmission when the packet transmission of the first radio circuit is to be performed; and
transmitting a predetermined message according to the information regarding the packet transmission in the predetermined frequency band by the second radio circuit to activate a protection scheme,
wherein the information regarding the packet transmission comprises a channel in which the packet transmission is to be performed and a time interval required for performing the packet transmission, and wherein the predetermined message is transmitted in the channel.

31. The method as claimed in claim 30, wherein after transmitting the predetermined message, there is no data or signal transmitted by a peer communications apparatus in the predetermined frequency band.

32. The method as claimed in claim 30, wherein the predetermined message is a clear to send (CTS) message.

* * * * *